July 25, 1933. P. G. PIERPONT 1,919,391
TOP FOR FRUIT AND VEGETABLE BOXES OR CRATES
Filed Dec. 31, 1932
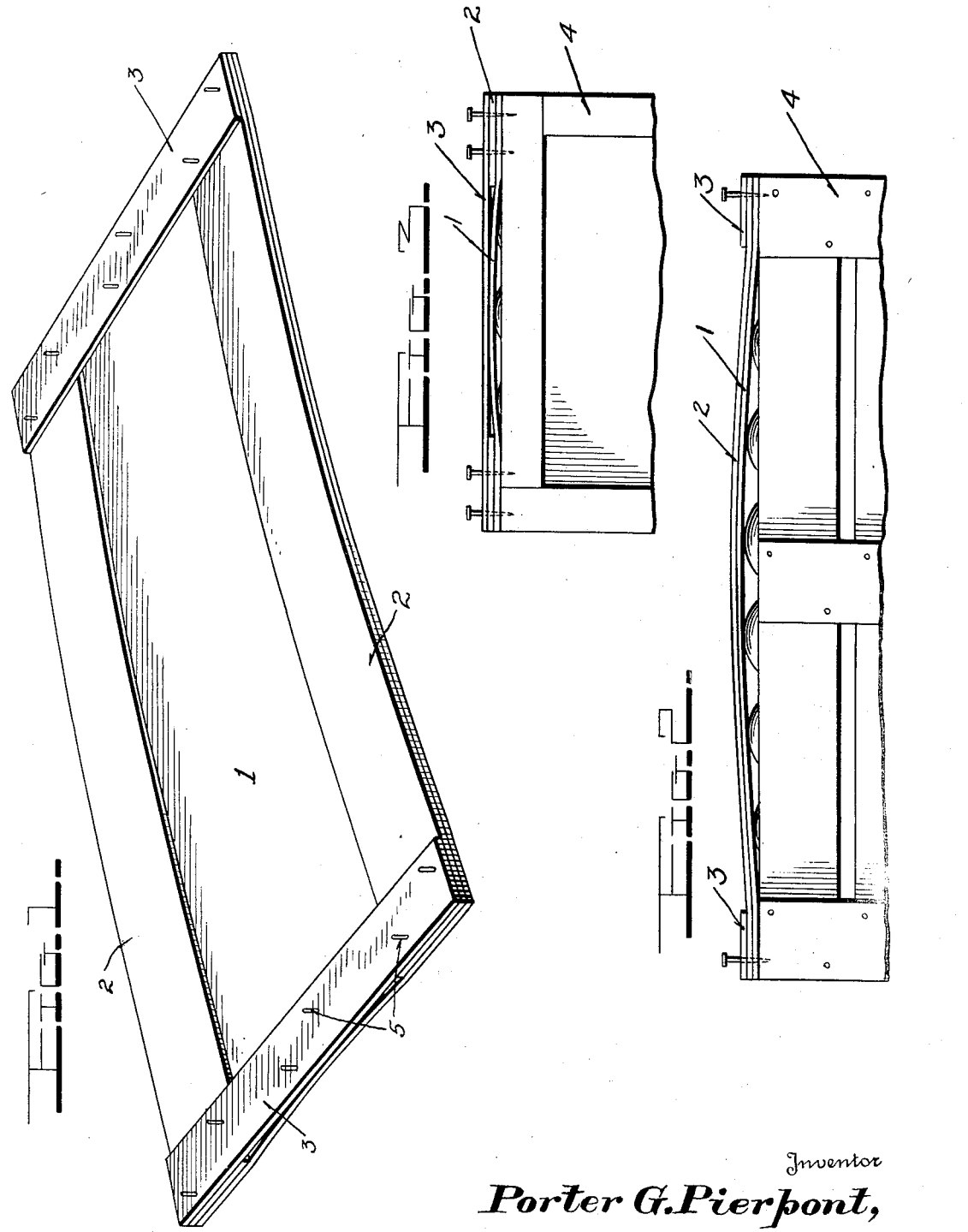
Inventor
*Porter G. Pierpont,*
By *Donald L. Maxson.*
Attorney Patented July 25, 1933

1,919,391

UNITED STATES PATENT OFFICE

PORTER G. PIERPONT, OF SAVANNAH, GEORGIA

TOP FOR FRUIT AND VEGETABLE BOXES OR CRATES

Application filed December 31, 1932. Serial No. 649,709.

This invention relates to improvements in covers for boxes or crates, and more particularly to a cover for an orange box on which the bulge pack is used when the boxes are filled with fruit.

An object of the invention is to provide an improved cover for orange or fruit and vegetable boxes and crates which will be flexible enough to spring or bend over the bulge pack of contents without bringing injurious pressure on the top layer of contents and at the same time be strong and stiff enough to hold and retain the contents of the box or crate during shipment.

Another object of the invention is to provide an improved cover for orange or fruit and vegetable boxes and crates which will be formed with a thin sheet of material that possesses the necessary flexibility, and which will be suitably reinforced at its side edges with second strips, which will provide the necessary stiffness and strength to retain the contents of the box or crate, said main sheet and second strips being secured at their ends to cross cleats in any suitable manner.

A further object of the invention is to provide an improved cover for orange or vegetable and fruit boxes and crates, which will be highly efficient in use, and quite inexpensive to manufacture.

Other objects will appear as the description proceeds.

In the accompanying drawing which forms a part of my application,

Figure 1 is a perspective view of my improved cover for orange or fruit and vegetable boxes and crates;

Figure 2 is a partial end view of an orange crate with my improved cover in position thereon; and Figure 3 is a side elevation of a portion of an orange crate, showing my improved cover thereon, said crate being packed with the bulge pack.

Like characters of reference are used throughout the following specification and the accompanying drawing to designate corresponding parts.

In carrying out my invention, I provide a main sheet or body 1 of material which is relatively thin and possesses the necessary flexibility for bending both longitudinally and transversely, and to provide the desired reinforcement at the opposite edges of the top or cover, I place narrow reinforcing strips 2 in contact with the upper surface of the body 1. These reinforcing strips may be attached to the body of the cover at the ends or at intervals or entirely by means of staples, tacks, glue, or any other desired securing means. Where one thickness is used for the body of the cover, any defect in the wood, such as brittleness or cross grain, is liable to cause splitting or breaking when the cover is bent and forced down over the contents of a box or crate. With my improved type of cover having the edges of the body reinforced with one or more superimposed strips, any one of the strips reinforces the others and prevents breakage or splitting.

Suitable cross cleats 3 will be placed transversely across the ends of the strips 2 and fastened thereto and to the body 1 by means of staples, tacks, glue, or any other desired securing means.

From the foregoing description, it will be apparent that due to the thinness of the body 1, the same will readily bend both transversely and longitudinally, so that when the fruit or vegetables are bulge packed within the box or crate 4, the edges of the cover will be properly reinforced to securely hold the fruit or vegetables in place without injury thereto, as is often the case where heavy covers are used. Also, the reinforced edges prevent the splitting of the cover with a consequent loss of the fruit or vegetables during shipment.

As clearly illustrated in Figures 1 and 3 of the drawing, the fastening of the middle portion of the body 1 to the cleats 3 by means of the staples 5, will cause the cover to assume a transverse bend, thereby more efficiently holding the bulge packed fruit or vegetables in the box or crate.

While I have illustrated a single reinforcing strip 2 at either side of the body 1, it will be understood that I may readily use a plurality of strips of any desired width on top of the main body and with any desired spacing.

The tops will be nailed on the boxes or crates in the usual manner after the same have been bulge packed.

Many minor changes in detail of construction may be resorted to without departure from the spirit of the invention.

Having thus described my invention what I claim as new and desire to secure by Letters Patent of the United States is:

1. A cover for fruit or vegetable boxes or crates consisting of a polygonal relatively flexible sheet of material with two or more reinforcing strips attached thereto along opposite edges, said strips having superposed upon their ends two substantially rigid cross pieces, the intermediate portions of said cross pieces being provided with means for drawing the aforesaid sheet of material into engagement with said cross pieces.

2. A cover for fruit or vegetable boxes or crates consisting of a polygonal relatively flexible sheet of material with two or more reinforcing strips attached thereto along opposite edges, said strips having superposed upon their ends two substantially rigid cross pieces, and means carried by said cross pieces for transversely bowing said sheet of material and drawing the said sheet into engagement with said cross pieces.

3. A cover for fruit or vegetable boxes or crates consisting of a polygonal relatively flexible sheet of material with two or more reinforcing strips attached thereto along opposite edges, substantially rigid cross pieces superposed upon the ends of said strips, and means carried by said cross pieces for transversely and longitudinally bowing said sheet of material and for drawing the same into engagement with said cross pieces.

PORTER G. PIERPONT.